United States Patent
Yang et al.

(10) Patent No.: US 11,776,166 B2
(45) Date of Patent: Oct. 3, 2023

(54) DISCRIMINATION BETWEEN VIRTUAL OBJECTS AND REAL OBJECTS IN A MIXED REALITY SCENE

(71) Applicant: Sony Interactive Entertainment LLC, San Mateo, CA (US)

(72) Inventors: Yiwei Yang, San Mateo, CA (US); Warren Benedetto, Foothill Ranch, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/497,783

(22) Filed: Oct. 8, 2021

(65) Prior Publication Data
US 2023/0114080 A1 Apr. 13, 2023

(51) Int. Cl.
*G06T 11/00* (2006.01)
*G06F 3/01* (2006.01)
*G06T 7/20* (2017.01)
*G06V 20/20* (2022.01)

(52) U.S. Cl.
CPC .............. *G06T 11/00* (2013.01); *G06F 3/011* (2013.01); *G06F 3/016* (2013.01); *G06T 7/20* (2013.01); *G06V 20/20* (2022.01); *G06T 2207/30241* (2013.01)

(58) Field of Classification Search
CPC ........................ G06T 11/00; G06T 7/20; G06T 2207/30241; G06V 20/20; G06F 3/011; G06F 3/016
See application file for complete search history.

(56) References Cited

U.S. PATENT DOCUMENTS

| | | | | |
|---|---|---|---|---|
| 2010/0052885 | A1* | 3/2010 | Hanqvist | G01J 5/0022 348/148 |
| 2013/0135196 | A1* | 5/2013 | Park | G06F 3/01 348/78 |
| 2013/0300653 | A1* | 11/2013 | Lewis | G06V 40/19 345/156 |
| 2014/0184550 | A1* | 7/2014 | Hennessey | G06F 3/041 345/173 |
| 2015/0277119 | A1* | 10/2015 | Wong | G02B 27/0176 345/633 |
| 2016/0124502 | A1* | 5/2016 | Sawyer | G02B 27/017 345/633 |
| 2017/0123747 | A1* | 5/2017 | Rochford | G06V 20/00 |
| 2017/0205892 | A1* | 7/2017 | Petrovskaya | G06T 17/20 |

\* cited by examiner

*Primary Examiner* — Terrell M Robinson
(74) *Attorney, Agent, or Firm* — Penilla IP, APC (57) ABSTRACT

A method for providing a mixed reality (MR) experience is provided, including: rendering a mixed reality view for a user on an MR headset, wherein the mixed reality view includes virtual elements; during the rendering of the mixed reality view, capturing sensor data by the MR headset, and analyzing the sensor data to detect real-world objects in a local environment in which the MR headset is disposed; determining a risk to the user posed by one or more of the identified real-world objects; responsive to determining the risk, then adjusting an appearance of at least one virtual element.

20 Claims, 6 Drawing Sheets

DISCRIMINATION BETWEEN VIRTUAL OBJECTS AND REAL OBJECTS IN A MIXED REALITY SCENE

FIELD OF THE DISCLOSURE

Implementations of the present disclosure relate to methods and systems enabling discrimination between virtual objects and real objects in a mixed reality experiences.

BACKGROUND

Description of the Related Art

In mixed reality systems, virtual objects are presented in a manner that is sensitive to, and interactive with, the real-world environment. Virtual objects are rendered so as to appear to be part of the three-dimensional real-world environment, with proper occlusion, dimensionality, and lighting. Mixed reality blends both virtual and real-world elements together to present a cohesive experience, which is distinguishable from virtual reality (complete replacement of the real-world with virtual rendering) and augmented reality (overlaying information upon real-world view).

It is in this context that implementations of the disclosure arise.

SUMMARY OF THE DISCLOSURE

Implementations of the disclosure are drawn to methods and systems enabling discrimination between virtual objects and real objects in a mixed reality experiences.

In some implementations, a method for providing a mixed reality (MR) experience is provided, including: rendering a mixed reality view for a user on an MR headset, wherein the mixed reality view includes virtual elements; during the rendering of the mixed reality view, capturing sensor data by the MR headset, and analyzing the sensor data to detect real-world objects in a local environment in which the MR headset is disposed; determining a risk to the user posed by one or more of the identified real-world objects; responsive to determining the risk, then adjusting an appearance of at least one virtual element.

In some implementations, determining the risk to the user is based on a proximity of the identified real-world objects to the user.

In some implementations, determining the risk to the user includes determining that a virtual element obstructs the user's view of the one or more of the identified real-world objects.

In some implementations, determining the risk to the user includes calculating a risk factor associated to the one or more of the identified real-world objects, and determining the risk factor to exceed a predefined threshold.

In some implementations, an amount of the adjusting of the appearance of at least one virtual element is based on the risk factor.

In some implementations, determining the risk to the user includes determining a trajectory of the one or more of the identified real-world objects.

In some implementations, determining the risk to the user includes determining a trajectory of the user.

In some implementations, adjusting the appearance of at least one virtual element includes adjusting a transparency of at least a portion of the at least one virtual element.

In some implementations, adjusting the appearance of at least one virtual element includes rendering a tag on the at least one virtual element.

In some implementations, the method further includes: further responsive to determining the risk, then activating a haptic feedback for the user.

In some implementations, a non-transitory computer readable medium is provided having program instructions embodied thereon that, when executed by at least one computing device, cause said at least one computing device to perform a method for providing a mixed reality (MR) experience, said method comprising: rendering a mixed reality view for a user on an MR headset, wherein the mixed reality view includes virtual elements; during the rendering of the mixed reality view, capturing sensor data by the MR headset, and analyzing the sensor data to detect real-world objects in a local environment in which the MR headset is disposed; determining a risk to the user posed by one or more of the identified real-world objects; responsive to determining the risk, then adjusting an appearance of at least one virtual element.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

As technology continues to advance, so does the ability to provide convincing and immersive rendering of virtual objects for mixed reality (MR) experiences. Through MR headsets with capable display and sensor technology, it is possible to provide rendering of virtual objects in a mixed reality view that appear to the user to be fully part of the real-world local environment. Virtual objects and elements can be presented with full occlusion (both occluding, and being occluded by, real-world physical objects) and appropriate lighting and three-dimensional structure. However, as virtual objects/elements in mixed reality become indistinguishable from real-world physical objects, and the mixed reality experience becomes more immersive, so the potential for dangerous situations arising from the blending of physical and virtual objects arises.

In some instances, a real-world physical object may pose a danger to the user. For example, a user might not see a real-world object that poses a risk, due to the real-world object being occluded by a virtual object, or due to the user focusing on a nearby virtual object while ignoring the real-world object (e.g., user risks running into another person because they don't see the other person). In other situations, a virtual object may pose a danger to the user. For example, the user might attempt to interact with the virtual object in a manner that is potentially dangerous for the user (e.g., user attempts to sit or lean on a virtual object).

In view of the potential dangers to users posed by immersive mixed reality experiences, it is beneficial to provide systems for warning a user of a potential risk, or enabling a user to distinguish between real and virtual objects so as to avoid dangerous situations.

Figure 1:
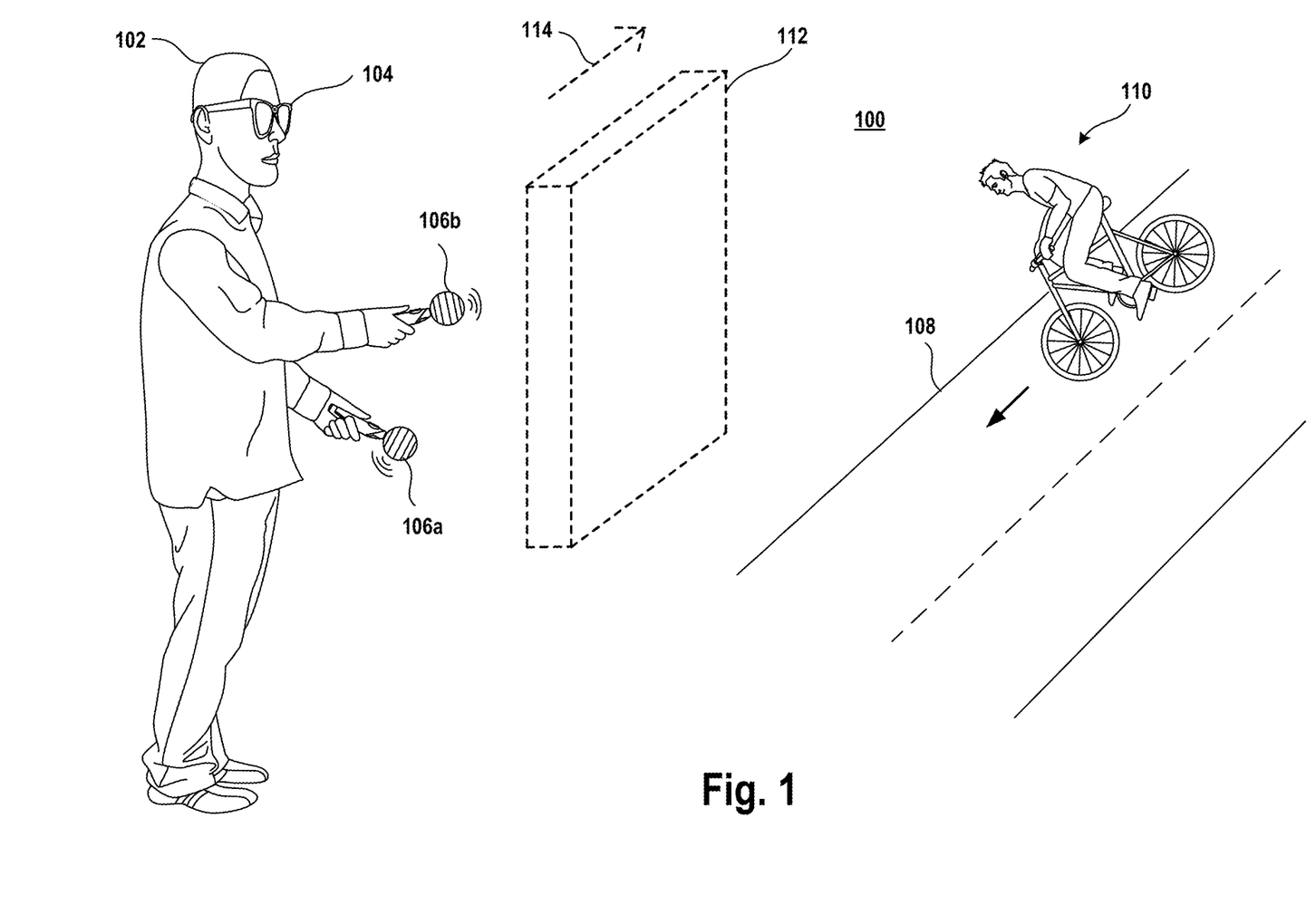
FIG. 1 conceptually illustrates a user interacting with a mixed reality experience, in accordance with implementations of the disclosure.

FIG. 1 conceptually illustrates a user interacting with a mixed reality experience, in accordance with implementations of the disclosure. In the illustrated implementation, a real-world local environment 100 is shown, with a user 102 experiencing a mixed reality view through an MR headset 104. In some implementations, the MR headset 104 is in the form of goggles or glasses or some other form of headset that is worn on the user's head. The MR headset 104 includes a display device capable of rendering virtual objects in the user's view, while also being capable of enabling the user to see through into the local environment 100. It will be appreciated that the MR headset 104 is capable of rendering virtual objects as if they were part of the local environment 100, and so as to appear to the user to interact with the local environment 100.

In the illustrated implementation, the user 102 may further provide input for interactive purposes via handheld controllers 106a and 106b. Such controllers 106a and 106b can also be configured to provide haptic feedback to the user 102.

In the illustrated implementation, a virtual object 112 is rendered in the mixed reality view provided by the MR headset 104 for the user 102. However, because of the presence of the virtual object 112 in the user's view, the user 102 might not be aware of their surroundings and may not be paying attention to other real-world objects, such as road 108 and a bicyclist 110 that is traveling along the road 108 and on a trajectory that may intersect with the user 102. In some implementations, the virtual object 112 may be blocking the user's view of the real-world objects, whereas in other implementations the virtual object 112 may be occupying the user's attention so that they are not paying attention to the real-world objects.

Thus, it is useful to provide mechanisms for warning the user of potential risks or dangers. Various mechanisms for providing notification or warning to the user are contemplated, such as visual, audio, and tactile feedback. In some implementations, visual notification is provided through the MR headset 104 by altering the rendering appearance of a virtual object, such as by causing at least part of the virtual object to blink, change color, exhibit surface texture changes/movements, etc. In some implementations, the transparency level of at least a portion of a virtual object is adjusted so as to at least partially allow the real-world environment to be visible through the virtual object. In some implementations, audio notification is provided by sounds such as beeps, or by audible speech warnings. In some implementations, audio notification is provided via speakers of the MR headset 104, through headphones, or through speakers of the controllers 106a and 106b. In some implementations, tactile feedback is provided as a warning/notification through the controllers 106a and 106b, or the MR headset 104.

In some implementations, the severity/intensity/amount of the feedback can be adjusted based on the determined level of risk/danger to the user. For example, a virtual object may exhibit greater fade-out (increased transparency) or tactile feedback can be of a higher intensity if the level of risk is higher.

By way of example without limitation, with continued reference to the illustrated implementation of FIG. 1, the appearance of the virtual object 112 may be altered so as to warn the user 102 of impending danger/risk. For example, the transparency of the virtual object 112 may be increased so that the user 102 is able to see through the virtual object 112 to more clearly see the road 108 or the bicyclist 110.

In some implementations, visual notification is provided in the form of additional rendered information for the user, such as an arrow directing the user to look in a certain direction. For example, an arrow 114 may be rendered in the user's MR view through the MR headset 104, directing the user 102 to look towards the direction where the bicyclist 110 is oncoming. In some implementations, other types of indicators can be utilized to highlight real-world objects or direct the user's attention towards real-world objects. In some implementations, an audio notification is configured to direct the user's attention in a particular direction or towards a particular object.

It will be appreciated that once a user becomes aware of a potential risk or danger, then it is no longer necessary to continue to warn the user. Thus, in some implementations, gaze tracking of the user can be used to confirm that the user has locked gaze on or comprehended a potential risk. That is, when the user's gaze is determined to have looked at a certain object or in a given direction for sufficient duration to indicate that the user has comprehended the risk, then the warning or notification to the user can be stopped. Again with reference to the scene shown at FIG. 1, gaze tracking of the user 102 can be used to confirm that the user 102 has looked at the bicyclist 110 or seen the road 108 and therefore notifications concerning such risks can be stopped.

Broadly speaking, warnings to the user can be progressively increased in accordance with increasing levels or increasing imminence of a risk/danger to the user. Increased warning can be associated with greater decreases in immersion and greater intrusiveness of the warning. Decreases in immersion can be achieved through reducing the realism of virtual objects, such as by increasing transparency, desaturating color, slowing/stopping animation, etc.

In some implementations, it is useful to enable users to distinguish between real and virtual objects, using recognizable marking or rendering so that users can easily identify and understand that a given virtual object is not real. By way of example without limitation, virtual objects can be visually tagged, such as with a dot, logo, or other marking. In some implementations, virtual objects can be rendered with a particular outline, or halo or glow, thereby indicating that they are virtual and not real objects. By enabling users to readily distinguish between real and virtual objects, user safety is enhanced when engaged in a MR experience.

Figure 2:
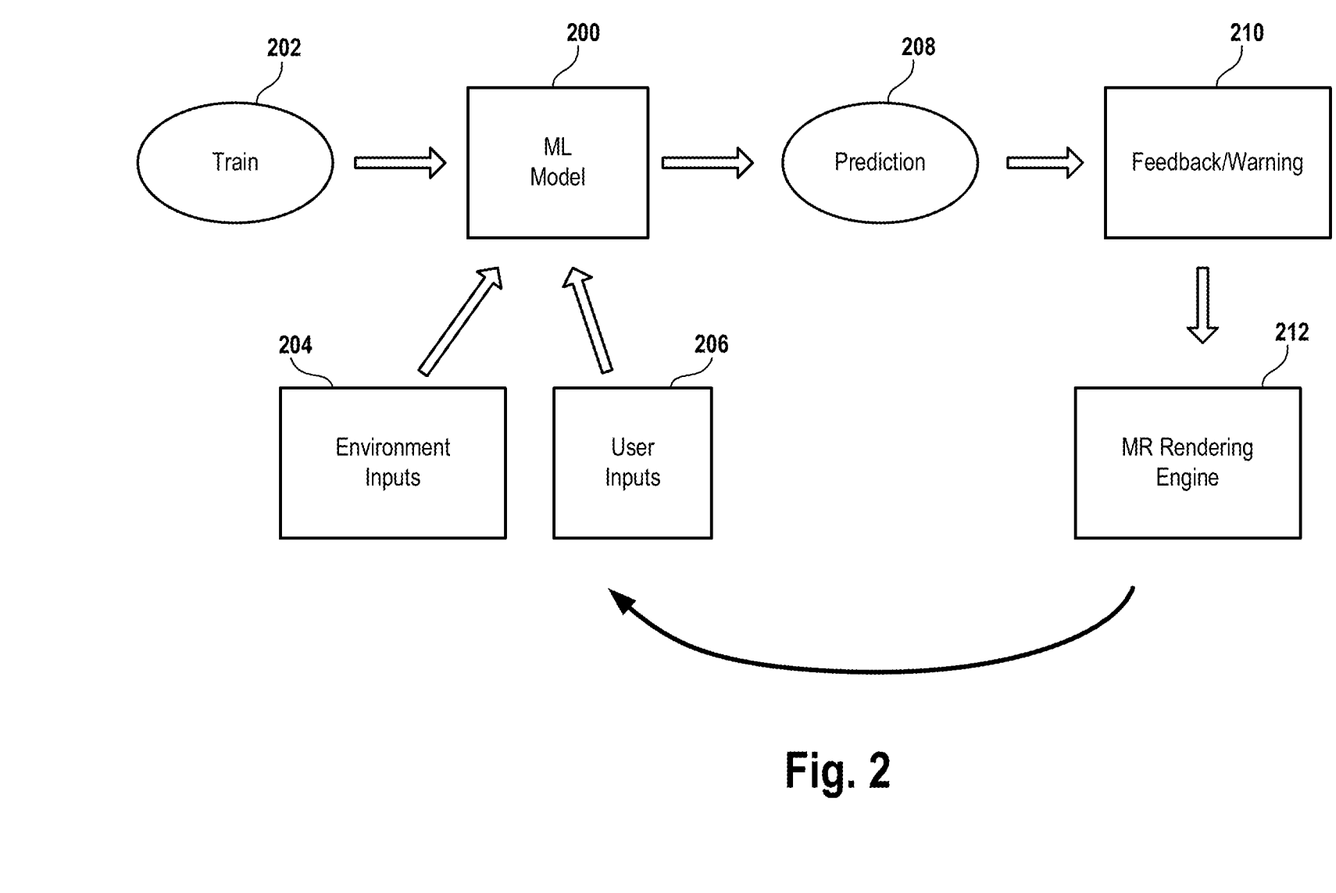
FIG. 2 conceptually illustrates a method for using machine learning to predict potentially dangerous situations so that feedback can be provided in a mixed reality environment, in accordance with implementations of the disclosure.

FIG. 2 conceptually illustrates a method for using machine learning to predict potentially dangerous situations so that feedback can be provided in a mixed reality environment, in accordance with implementations of the disclosure. Broadly speaking, a machine learning (ML) model 200 can be trained and used to determine risks to the user or predict potentially hazardous situations. Initially, the ML model 200 can be trained 202 using training data, to be able to recognize objects in the local environment and predict or identify risks to the user.

The trained ML model 200 will be configured to perform prediction based on environment inputs 204 and user inputs 206. Examples of environment inputs 204 include data collected from sensors that sense the local environment, such as cameras, 3D depth cameras, LIDAR, microphones, etc. Such sensors can be included in the MR headset or otherwise attached to or held by the user in various implementations. Through such environment inputs 204, objects in the local environment can be detected and recognized by the ML model 200. Furthermore, movements and trajectories of objects can be determined, and their movements can also be predicted.

Examples of user inputs 206 include data collected from sensors or input devices which detect activity by the user, such as inertial sensors, accelerometers, gyroscopes, magnetometers, cameras, etc. which may also be included in the MR headset or otherwise attached to or held by the user. User inputs 206 can further include input obtained through a controller input device operated by the user, such as a joystick, buttons, touchpad, etc. Through such user inputs 206, the actions of the user can be determined and used by the ML model 200 to determine or predict the user's activity. In some implementations, head and/or gaze tracking of the user via sensors included in the ML headset is utilized to determine the direction of the user or what the user is looking at. Further sensors can be attached to or worn by the user to enable tracking of the user's body, limbs, hands, feet, etc. The posture of the user, their direction, speed of travel, and the orientation of the user's body or limbs can be used to predict the user's trajectory or path, or what actions they are likely to perform in the future.

In accordance with the above, the ML model 200 can be applied to the environment inputs 204 and the user inputs 206 to perform prediction/inference 208 to identify possible risks to the user during the course of a mixed reality experience. In some implementations, a risk determination is generated based on the types of objects recognized in the local environment, their trajectory or movement, as well as the movement/trajectory and activity of the user, including the inferred attention of the user (e.g., based on gaze tracking of the user). Objects can have certain levels of risk associated with them, and this can be a factor in determining possible risks to the user. For example, objects such as roads, train tracks, stairs, and manholes may have high levels of associated risk versus other types of objects. Objects in motion can be recognized and tracked (e.g. cars, scooters, bicycles, etc.), and their movements predicted to determine the risks posed to the user by such objects. It will be appreciated that the movements/activity of other persons or animals can be identified and predicted as well, and possible risks posed to the user and/or the other persons/animals can be determined by the ML model.

Based on the inference/prediction 208 identifying risks to the user, then at operation 210 an appropriate feedback or warning is determined for surfacing to the user. Such feedback can be in accordance with that described herein, and may include adjustments to the rendering of virtual objects in the user's view, or rendering of warnings/notifications, which can be effected via the MR rendering engine 212 that renders virtual objects in the user's view. Feedback or warning can also be effected through haptic mechanisms, audio feedback, etc.

It will be appreciated that in response to the feedback, the user may react in some fashion, such as by changing their movement behavior, shifting their attention or gaze direction, or some other behavioral change, and that this user response can be detected and will be incorporated in the user inputs 206 going forward. Based on the updated user behavior, then the ML model 200 may infer that less risk is posed by a given situation and accordingly, feedback/warnings will be reduced or stopped.

Additionally, it is noted that the ML model's inference/prediction capability can be improved over time, as the actual tracked motion/activity of objects over time can serve as feedback to tune the inference/prediction of the ML model.

Figure 3:
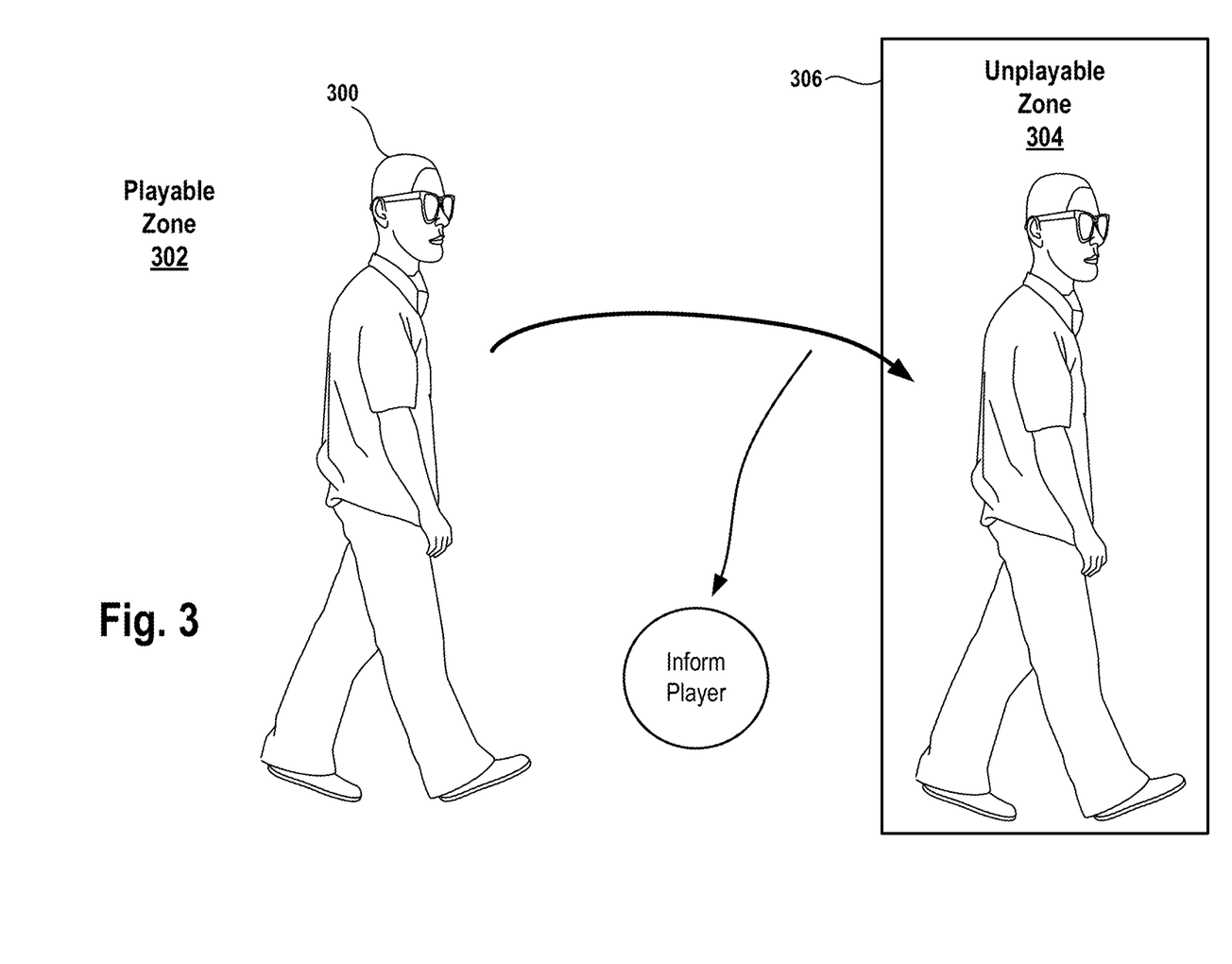
FIG. 3 conceptually illustrates implementation of prohibited zones for mixed reality, in accordance with implementations of the disclosure.

FIG. 3 conceptually illustrates implementation of prohibited zones for mixed reality, in accordance with implementations of the disclosure.

It will be appreciated that some regions of the real world environment may be deemed to be unsafe for mixed reality experiences, and therefore, such regions can be designated as prohibited or unplayable zones for which MR rendering will simply not be functional. For example, a subway station or a real-world region with high amounts of traffic could be such a region designated as a prohibited zone. It will be appreciated that the user's location may be determined through one or more technologies such as GPS, image recognition, etc.

With reference to the illustrated implementation, when a user 300 moves from a playable zone 302 for which MR rendering is enabled, to an unplayable zone 304 for which MR rendering is disabled, then in some implementations, a mechanism is provided to inform the user 300 that they are entering an unplayable zone 304. In some implementations, visual notifications can be rendered in the user's view informing them that they are crossing into the unplayable zone 304. In some implementations, audio notifications can be provided.

In some implementations, graphical renderings indicating the boundaries of the unplayable zone 304 can be provided, such as a virtual boundary 306. Examples include virtual walls, fences, barriers, boundary graphics rendered along the ground or floor (e.g., hashed area of the floor), etc. In some implementations, graphics or notifications are rendered on existing physical boundary objects, such as on doors, walls, etc. Such notifications or graphics can provide warning to a user that is crossing over into an unplayable zone. In some implementations, the graphics that indicate boundaries of the unplayable zone are configured to steer users away from the unplayable zone. In some implementations, such graphics may have specific colors to denote to the user that such zones are not available for MR experiences. For example, boundary graphics may utilize red coloring, to denote "red-zones" in which the MR experience is turned off for safety reasons.

It will be appreciated that in some implementations, by rendering graphical virtual barriers, this can enhance user safety by providing a perceived barrier to the user so that the user is unlikely to move through the virtual barrier and into a particular region of physical space that may be deemed unsafe for the user.

Figure 4:
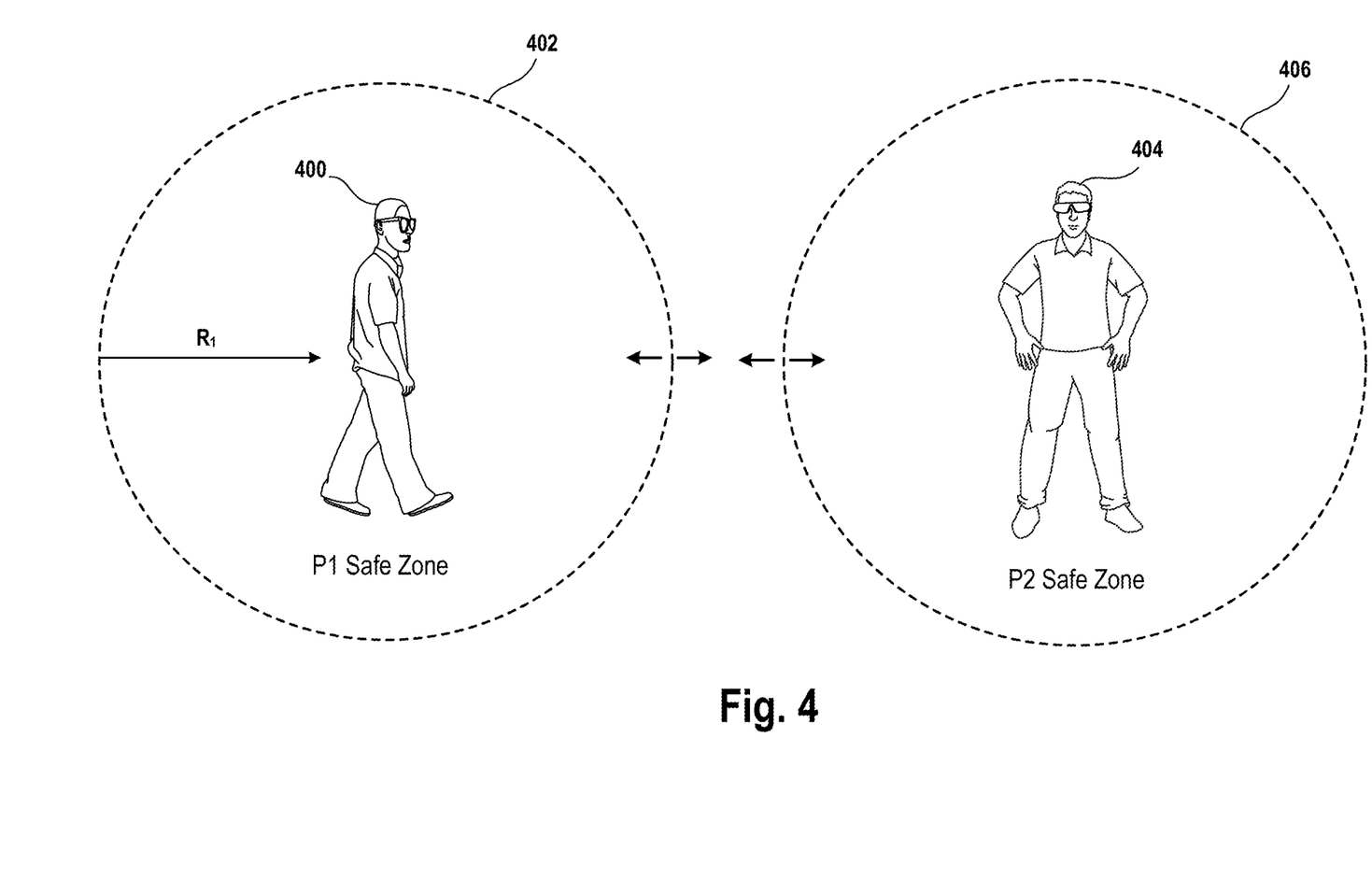
FIG. 4 conceptually illustrates users of MR headsets being provided with dynamic safe zones for mixed reality, in accordance with implementations of the disclosure.

FIG. 4 conceptually illustrates users of MR headsets being provided with dynamic safe zones for mixed reality, in accordance with implementations of the disclosure. In some implementations, in order to promote safety of a user engaged in an MR experience, and also the safety of others in the vicinity of the user, then a dynamic safe zone is defined for the user. That is, a zone or region of interaction space around the user can be identified or monitored as a region that is required to be free of other persons, users, or certain types of objects, in order for the MR experience to initiate or continue in a normal fashion.

For example, in the illustrated implementation, the user 400 may have a safe zone 402 in the local environment that defines a minimum region required to be free of others for the MR experience to be rendered. In some implementations, the safe zone 402 is defined as a region falling within a predefined radius R1 of the user 400. If another person enters into the safe zone 402, then various actions can be taken, such as adjusting the MR rendering to reduce the immersiveness of the MR experience as described above, including fading out or increasing the transparency of virtual objects, providing warnings or notifications, etc.

In some implementations, when multiple users are engaged in respective MR experiences, each user may have their own safe zone. For example, in the illustrated implementation, another user 404 is also present in the local environment, and engaged in a MR experience for which a safe zone 406 is defined. It will be appreciated that in the case of multiple users in the same local environment, their respective safe zones may infringe on each other, and this would occur prior to either user actually physically entering the other user's safe zone.

Therefore, in some implementations, MR headsets of the users 400 and 404 are configured to communicate with each other, and more specifically communicate their respective safe zones or minimum safe distances. Then, if a given MR headset determines that it's safe zone is infringing on another user's safe zone, then a notification or warning can be provided, or MR rendering may be adjusted to reduce immersion as previously described.

In some implementations, safe zones can be constructed as variable play areas based on game design and requirements as well as others' interaction spaces. A given safe zone play area envelope can increase or decrease, or change shape, depending on what is likely to happen based on what is happening in the game, for example, as determined from monitoring the game state. Additionally, in some implementations, gameplay may be adjusted in response to player proximity to another person or user. For example, the player may not be allowed to use a particular virtual weapon requiring a given amount of physical space for interactive use if there is not enough room to use it. Such a virtual weapon may be disabled in the gameplay until there is sufficient free space available.

Additional problems in mixed reality amongst multiple users arises from multiple users having different MR experiences. In general, people typically react based on a common shared physical reality. But with mixed reality, different users may see different realities. For example, users may not share the same mixed reality view if they are engaged in different mixed reality programs such as different games or other experiences. Further, different users using different devices from different manufacturers may experience different realities.

Therefore, in some implementations, MR headsets are configured to share mixed reality information between two different users having different experiences. In some implementations, a common protocol is enabled for sharing information about virtual objects between two MR headsets, including by way of example without limitation, 3D shape, size, dimensions, placement, density, or other characteristics. And using such information, representations of virtual objects from another user's MR experience may be rendered in a given user's view. In some implementations, because of privacy issues, such representations may be configured to reveal that a virtual object is present in the other user's view, but without revealing what that virtual object actually is. For example, a mesh or basic geometry, or other simplified rendering can be provided. In this manner, a given user may be informed that there is a virtual object that the other user is going to react to, and the given user can therefore proceed accordingly in a safe manner.

In some implementations, the sharing of information between MR headsets is performed via a peer-to-peer sharing mechanism/protocol to reduce the latency of sharing information.

Figure 5:
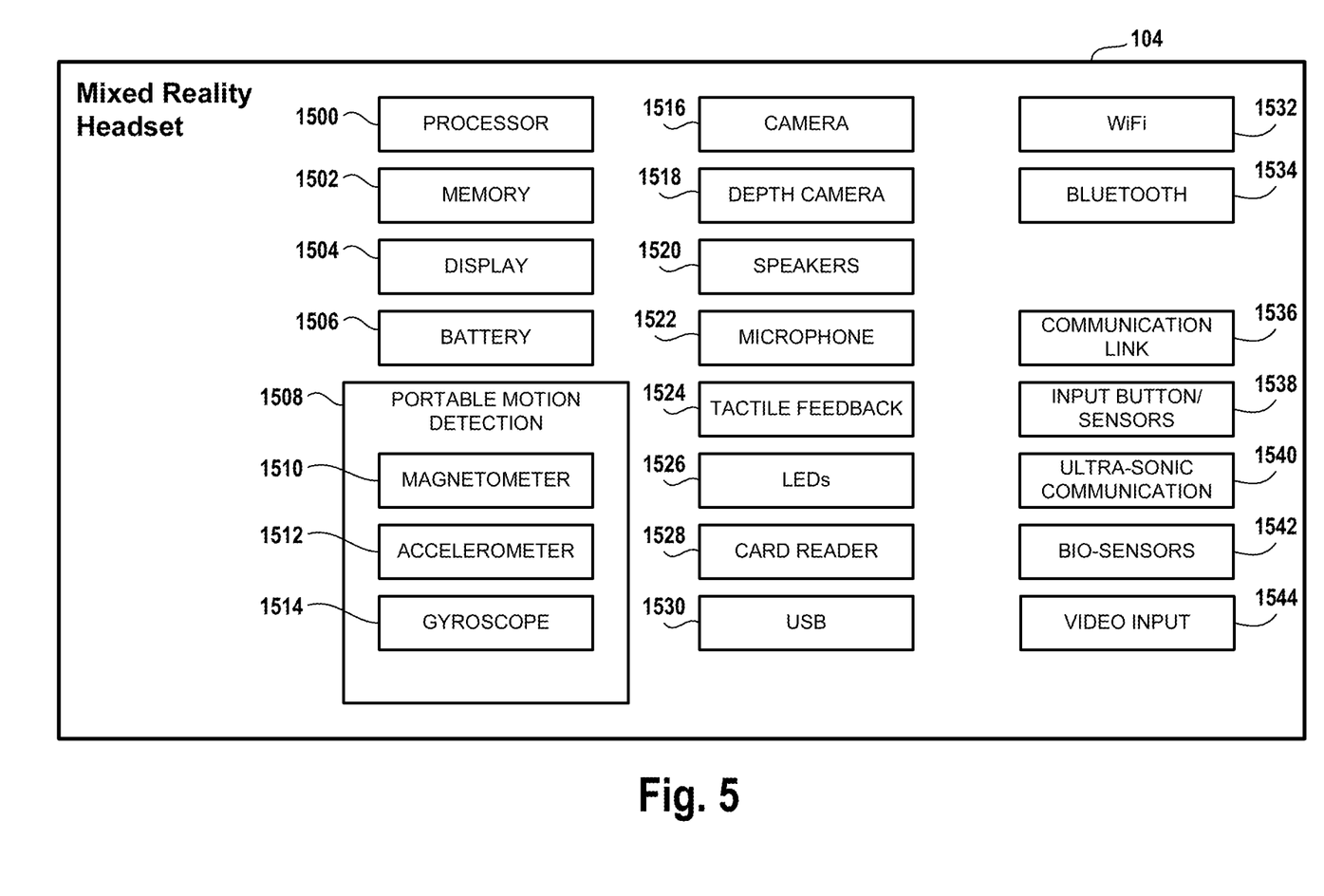
FIG. 5 is a diagram illustrating components of a MR headset, in accordance with an implementation of the disclosure.

With reference to FIG. 5, a diagram illustrating components of a MR headset 104 is shown, in accordance with an implementation of the disclosure. In some implementations, the MR headset is in the form factor of glasses, goggles, a helmet, or other types of headset form factors that enable mixed reality viewing. The MR headset 104 includes a processor 1500 for executing program instructions. A memory 1502 is provided for storage purposes, and may include both volatile and non-volatile memory. A display 1504 is included which enables rendering of mixed reality content for viewing by the user. In some implementations, the display is an optical see-through display which enables physical viewing through the substantially transparent display to see the local environment, while also providing for rendering of content in the user's view. Whereas in other implementations, the display is a video see-through display, in which the user does not physically see through the display, but in which captured video of the real environment is rendered on the display in real-time with virtual elements being added. A battery 1506 is provided as a power source for the MR headset 104. A motion detection module 1508 may include any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1512 are used to provide the direction of gravity, which gives an absolute reference for two angles (world-space pitch and world-space roll).

A magnetometer measures the strength and direction of the magnetic field in the vicinity of the MR headset. In one implementation, three magnetometers 1510 are used within the MR headset, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1512 is used together with magnetometer 1510 to obtain the inclination and azimuth of the MR headset 104.

In some implementations, the magnetometers of the MR headset are configured so as to be read during times when electromagnets in other nearby devices are inactive.

A gyroscope is a device for measuring or maintaining orientation, based on the principles of angular momentum. In one implementation, three gyroscopes 1514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/ orientation determination based on visual tracking of an object, accelerometer, magnetometer, etc.

A camera 1516 is provided for capturing images and image streams of a real environment. More than one camera may be included in the MR headset 104, including a camera that is outward-facing (directed away from a user when the user is viewing the display of the MR headset 104), and a camera that is inward-facing (directed towards the user when the user is viewing the display of the MR headset 104). Additionally, a depth camera 1518 may be included in the MR headset 104 for sensing depth information of objects in a real environment.

The MR headset 104 includes speakers 1520 for providing audio output. Also, a microphone 1522 may be included for capturing audio from the real environment, including sounds from the ambient environment, speech made by the user, etc. The MR headset 104 includes tactile feedback module 1524 for providing tactile feedback to the user. In one implementation, the tactile feedback module 1524 is capable of causing movement and/or vibration of the MR headset 104 so as to provide tactile feedback to the user.

LEDs 1526 are provided as visual indicators of statuses of the MR headset 104. For example, an LED may indicate battery level, power on, etc. A card reader 1528 is provided to enable the MR headset 104 to read and write information to and from a memory card. A USB interface 1530 is included as one example of an interface for enabling connection of peripheral devices, or connection to other devices, such as other portable devices, computers, etc. In various implementations of the MR headset 104, any of various kinds of interfaces may be included to enable greater connectivity of the MR headset 104.

A WiFi/cellular module 1532 is included for enabling connection to the Internet or a local area network via wireless networking technologies such as WiFi or cellular (e.g., 4G, 5G, etc.) or other wireless networking technologies. Also, the MR headset 104 includes a Bluetooth module 1534 for enabling wireless connection to other devices. A communications link 1536 may also be included for connection to other devices. In one implementation, the communications link 1536 utilizes infrared transmission for wireless communication. In other implementations, the communications link 1536 may utilize any of various wireless or wired transmission protocols for communication with other devices.

Input buttons/sensors 1538 are included to provide an input interface for the user. Any of various kinds of input interfaces may be included, such as buttons, touchpad, joystick, trackball, etc. An ultra-sonic communication module 1540 may be included in MR headset 104 for facilitating communication with other devices via ultra-sonic technologies.

Bio-sensors 1542 are included to enable detection of physiological data from a user. In one implementation, the bio-sensors 1542 include one or more dry electrodes for detecting bio-electric signals of the user through the user's skin.

A video input 1544 is configured to receive a video signal from a primary processing computer (e.g. portable game console) for rendering on the MR headset. In some implementations, the video input is an HDMI input.

The foregoing components of MR headset 104 have been described as merely exemplary components that may be included in MR headset 104. In various implementations of the disclosure, the MR headset 104 may or may not include some of the various aforementioned components. Implementations of the MR headset 104 may additionally include other components not presently described, but known in the art, for purposes of facilitating aspects of the present disclosure as herein described.

Figure 6:
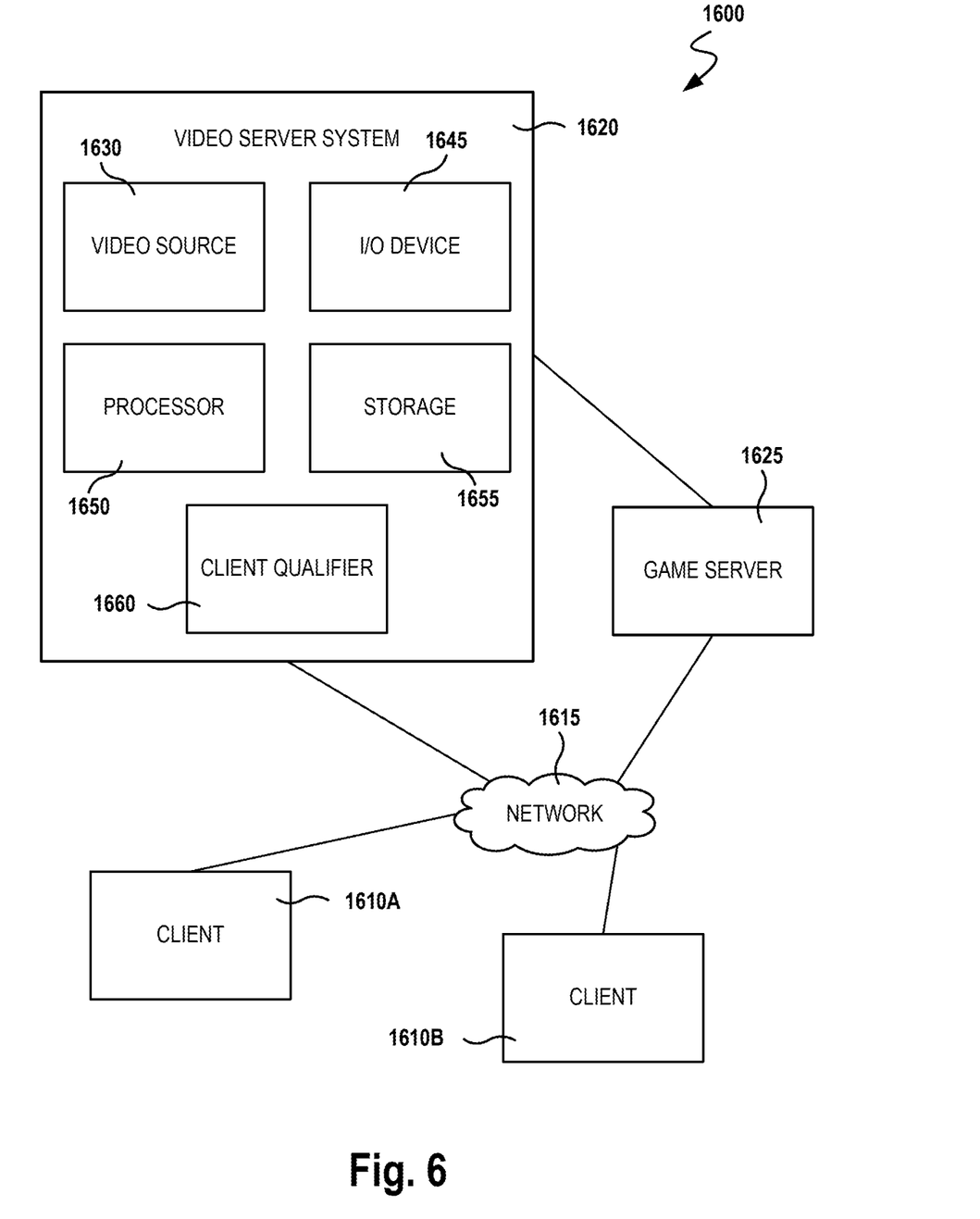
FIG. 6 is a block diagram of a Game System, according to various implementations of the disclosure.

FIG. 6 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include MR headsets, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD/MR headset may cooperate with the video server system 1620 to deliver a game viewed through the HMD/MR headset. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command. Game commands are optionally communicated from Client 1610A through a different route or communication channel than that used to provide audio or video streams to Client 1610A.

Game Server 1625 is optionally operated by a different entity than Video Server System 1620. For example, Game Server 1625 may be operated by the publisher of a multiplayer game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD/MR headset that includes a browser. In another implementation, client 1610A is a game console having a browser, which may be displayed on the HMD/MR headset. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, optical media, non-optical data storage devices, etc. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

The invention claimed is:

1. A method for providing a mixed reality (MR) experience, comprising:
    rendering a mixed reality view for a user on an MR headset, wherein the mixed reality view includes virtual elements;
    tracking a gaze of the user during the rendering of the mixed reality view;
    during the rendering of the mixed reality view, capturing sensor data by the MR headset, and analyzing the sensor data to detect real-world objects in a local environment in which the MR headset is disposed;
    determining a risk to the user posed by one or more of the identified real-world objects;
    responsive to determining the risk, then adjusting an appearance of at least one virtual element; and,
    following the adjusting of the appearance, responsive to detecting the gaze of the user looking at the one or more of the identified real-world objects posing the risk, including detecting the gaze directed toward the one or more of the identified real-world objects for at least a predefined duration, then stopping the adjusting of the appearance of the at least one virtual element.

2. The method of claim 1, wherein determining the risk to the user is based on a proximity of the identified real-world objects to the user.

3. The method of claim 1, wherein determining the risk to the user includes determining that a virtual element obstructs the user's view of the one or more of the identified real-world objects.

4. The method of claim 1, wherein determining the risk to the user includes calculating a risk factor associated to the one or more of the identified real-world objects, and determining the risk factor to exceed a predefined threshold.

5. The method of claim 4, wherein an amount of the adjusting of the appearance of at least one virtual element is based on the risk factor.

6. The method of claim 1, wherein determining the risk to the user includes determining a trajectory of the one or more of the identified real-world objects.

7. The method of claim 1, wherein determining the risk to the user includes determining a trajectory of the user.

8. The method of claim 1, wherein adjusting the appearance of at least one virtual element includes adjusting a transparency of at least a portion of the at least one virtual element.

9. The method of claim 1, wherein adjusting the appearance of at least one virtual element includes rendering a tag on the at least one virtual element.

10. The method of claim 1, further comprising:
    further responsive to determining the risk, then activating a haptic feedback for the user.

11. The method of claim 1, wherein adjusting the appearance of the at least one virtual element includes changing a color of an outline or surface of the at least one virtual element.

12. A non-transitory computer readable medium having program instructions embodied thereon that, when executed by at least one computing device, cause said at least one computing device to perform a method for providing a mixed reality (MR) experience, said method comprising:
    rendering a mixed reality view for a user on an MR headset, wherein the mixed reality view includes virtual elements;
    tracking a gaze of the user during the rendering of the mixed reality view;

during the rendering of the mixed reality view, capturing sensor data by the MR headset, and analyzing the sensor data to detect real-world objects in a local environment in which the MR headset is disposed;

determining a risk to the user posed by one or more of the identified real-world objects;

responsive to determining the risk, then adjusting an appearance of at least one virtual element; and, following the adjusting of the appearance, responsive to detecting the gaze of the user looking at the one or more of the identified real-world objects posing the risk, including detecting the gaze directed toward the one or more of the identified real-world objects for at least a predefined duration, then stopping the adjusting of the appearance of the at least one virtual element.

13. The non-transitory computer readable medium of claim 12, wherein determining the risk to the user is based on a proximity of the identified real-world objects to the user.

14. The non-transitory computer readable medium of claim 12, wherein determining the risk to the user includes determining that a virtual element obstructs the user's view of the one or more of the identified real-world objects.

15. The non-transitory computer readable medium of claim 12, wherein determining the risk to the user includes calculating a risk factor associated to the one or more of the identified real-world objects, and determining the risk factor to exceed a predefined threshold.

16. The non-transitory computer readable medium of claim 15, wherein an amount of the adjusting of the appearance of at least one virtual element is based on the risk factor.

17. The non-transitory computer readable medium of claim 12, wherein determining the risk to the user includes determining a trajectory of the one or more of the identified real-world objects.

18. The non-transitory computer readable medium of claim 12, wherein determining the risk to the user includes determining a trajectory of the user.

19. The non-transitory computer readable medium of claim 12, wherein adjusting the appearance of at least one virtual element includes adjusting a transparency of at least a portion of the at least one virtual element.

20. The non-transitory computer readable medium of claim 12, wherein adjusting the appearance of at least one virtual element includes rendering a tag on the at least one virtual element.

* * * * *